(12) United States Patent
Bulut et al.

(10) Patent No.: US 12,386,970 B2
(45) Date of Patent: Aug. 12, 2025

(54) COMBINING POLICY COMPLIANCE AND VULNERABILITY MANAGEMENT FOR RISK ASSESSMENT

(71) Applicant: INTERNATIONAL BUSINESS MACHINES CORPORATION, Armonk, NY (US)

(72) Inventors: Muhammed Faith Bulut, West Greenwich, RI (US); Abdulhamid Adebowale Adebayo, White Plains, NY (US); Lilian Mathias Ngweta, Troy, NY (US); Ting Dai, Elmsford, NY (US); Constantin Mircea Adam, Fairfield, CT (US); Daby Mousse Sow, Croton on Hudson, NY (US); Steven Ocepek, Cuyahoga Falls, OH (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 17/643,205

(22) Filed: Dec. 8, 2021

(65) Prior Publication Data

US 2023/0177169 A1 Jun. 8, 2023

(51) Int. Cl.
G06F 21/57 (2013.01)
G06F 21/56 (2013.01)
G06N 5/04 (2023.01)

(52) U.S. Cl.
CPC .......... *G06F 21/577* (2013.01); *G06F 21/566* (2013.01); *G06N 5/04* (2013.01); *G06F 2221/034* (2013.01)

(58) Field of Classification Search
None
See application file for complete search history.

(56) References Cited

U.S. PATENT DOCUMENTS 9,912,686 B2  3/2018  Mahabir
9,930,061 B2  3/2018  Zandani
(Continued)

FOREIGN PATENT DOCUMENTS

| CN | 108965253 A | 12/2018 |
|----|-------------|---------|
| CN | 110533536 A | 12/2019 |
| CN | 113010673 A | 6/2021  |

OTHER PUBLICATIONS

Notification of Transmittal of the International Search Report and the Written Opinion of the International Searching Authority, or the Declaration, International Application No. PCT/EP2022/084587, Feb. 15, 2023, 9 pgs.

*Primary Examiner* — Syed A Roni
(74) *Attorney, Agent, or Firm* — Kelsey Skodje

(57) ABSTRACT

An apparatus, a method, and a computer program product are provided that combine policy compliance with vulnerability management to provide a more accurate risk assessment of an environment. The method includes training a policy machine learning model using a first training dataset to generate a policy machine learning model to produce mitigation technique classifications and training a vulnerability machine learning model using a second training dataset to generate a vulnerability machine learning model to produce weakness type classifications. The method also includes mapping the mitigation technique classifications to attack techniques to produce a policy mapping and mapping the weakness type classifications to the attack techniques to produce a vulnerability mapping. The method further includes producing a risk assessment of a vulnerability based on the policy mapping and the vulnerability mapping.

20 Claims, 6 Drawing Sheets

(56) References Cited

U.S. PATENT DOCUMENTS

| | | |
|---|---|---|
| 10,740,469 B2 | 8/2020 | Zheng |
| 10,791,139 B2 | 9/2020 | Scott |
| 2012/0203590 A1 | 8/2012 | Deb |
| 2020/0202268 A1* | 6/2020 | Retna .................... G06N 20/00 |
| 2021/0027218 A1 | 1/2021 | Chiluka |
| 2021/0084059 A1 | 3/2021 | Sun |
| 2021/0264038 A1* | 8/2021 | Butchko ............. H04L 63/1433 |
| 2021/0312058 A1 | 10/2021 | Chiarelli et al. |
| 2022/0286474 A1* | 9/2022 | Kuppa .................. H04L 63/145 |

* cited by examiner

COMBINING POLICY COMPLIANCE AND VULNERABILITY MANAGEMENT FOR RISK ASSESSMENT

BACKGROUND

The present disclosure relates to risk assessment, and more specifically, to combining policy compliance with vulnerability management to provide a more accurate risk assessment of an environment.

Enterprise security is a complex problem requiring coordination across security policies, controls, threat models, and threat detection scenarios (use cases). The implementation of these policies, models, and controls requires extensive use of threat monitoring technologies, security devices, and resources that have security, business, and technical skills. The ever-increasing number of threats at scale requires automation in support of analysts responsible for preventing, detecting, and responding to these threats. In most cases, the analyst must manually search through a wide range of data sources, review past threat events and how they were handled, check for duplicate events, currently open events, and the knowledge database on the appropriate response procedures to handle the information.

Currently, there are a variety of tools that exist for threat monitoring to analyze a wide range of data sources, including structured data, unstructured data, semi-structured data, and reference data to identify patterns that are indicative of threats, security policy, and control anomalies. When these threats and/or anomalies are detected, "actionable" alerts are created. Once the factors are considered, security analysts can determine the optimal disposition for a specific alert.

SUMMARY

Embodiments of the present disclosure include a method for combining policy compliance with vulnerability management to provide a more accurate risk assessment of an environment. The method includes training a policy machine learning model using a first training dataset to generate a policy machine learning model to produce mitigation technique classifications and training a vulnerability machine learning model using a second training dataset to generate a vulnerability machine learning model to produce weakness type classifications. The method also includes mapping the mitigation technique classifications to attack techniques to produce a policy mapping and mapping the weakness type classifications to the attack techniques to produce a vulnerability mapping. The method further includes producing a risk assessment of a vulnerability based on the policy mapping and the vulnerability mapping.

Additional embodiments of the present disclosure include a computer program product for combining policy compliance with vulnerability management to provide a more accurate risk assessment of an environment, a computer-readable storage medium having a computer-readable program stored therein, wherein the computer-readable program, when executed on a computing device, causes the computing device to train a policy machine learning model using a first training dataset to generate a policy machine learning model to produce mitigation technique classifications and train a vulnerability machine learning model using a second training dataset to generate a vulnerability machine learning model to produce weakness type classifications. The computer program also causes the computing device to map the mitigation technique classifications to attack techniques to produce a policy mapping and map the weakness type classifications to the attack techniques to produce a vulnerability mapping. The computer program also causes the computing device to produce a risk assessment of a vulnerability based on the policy mapping and the vulnerability mapping.

Further embodiments of the present disclosure include an apparatus for dynamically selecting features and machine learning models for combining policy compliance with vulnerability management to provide a more accurate risk assessment of an environment. The apparatus includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
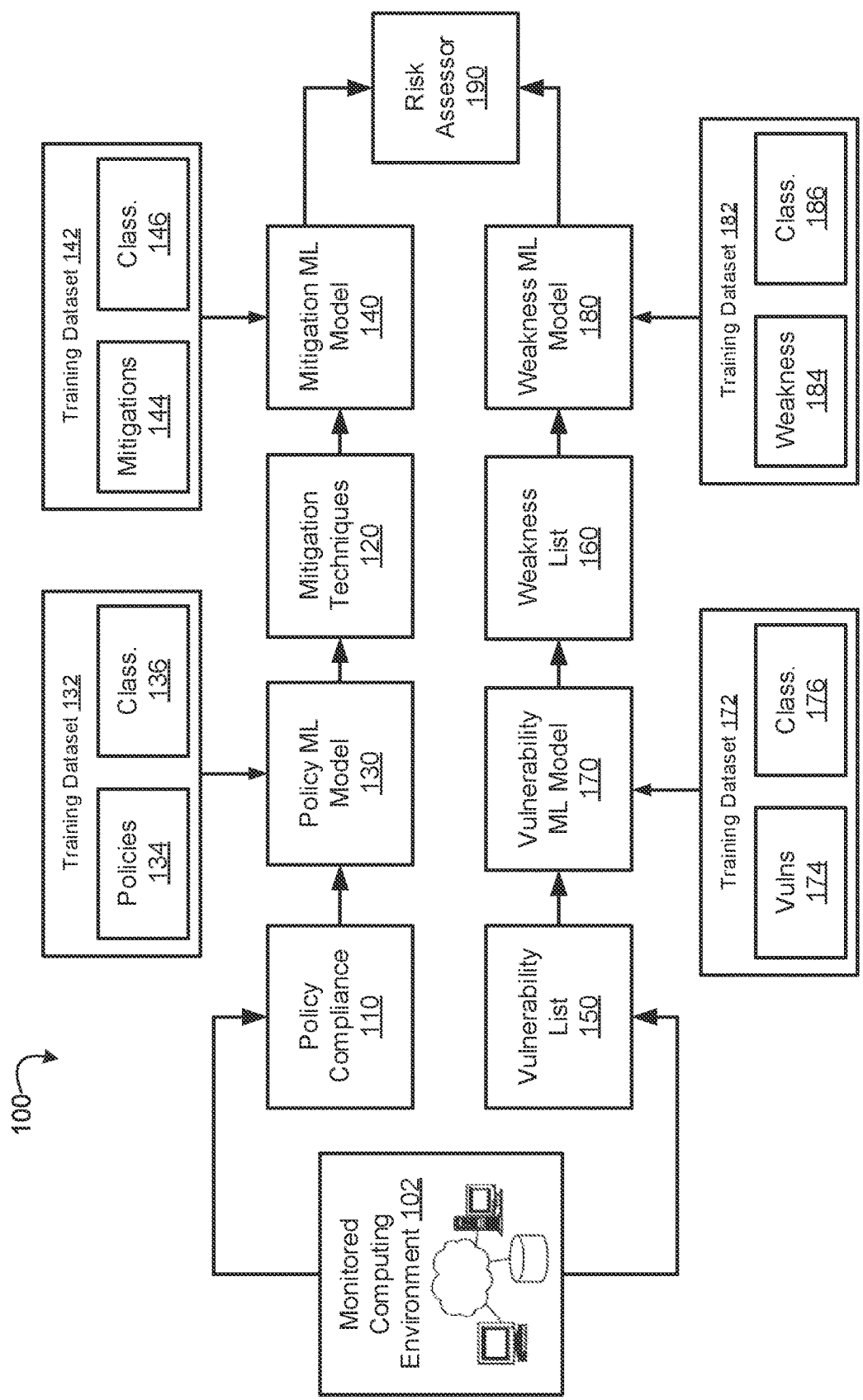
FIG. 1 is a block diagram illustrating an operation of the primary operational elements of an improved computing tool used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to risk assessment, and more specifically, to combining policy compliance with vulnerability management to provide a more accurate risk assessment of an environment. While the present disclosure is not necessarily limited to such applications, various aspects of the disclosure may be appreciated through a discussion of various examples using this context.

Information systems security (ISS) attempts to protect information and the systems that store and process the information. This protection is against the risk that could lead to unauthorized access, use, disclosure, disruption, modification, or destruction of information. Organizations employ security policies that are designed to protect the information against risk. Policy compliance management, or governance, is put in place to ensure compliance with those policies, processes, standards, and guidelines. When policies are being followed, there is a degree of assurance that critical information is being properly managed. Additionally, regulators can look at policy compliance that risks to shareholders, customers, and the public is being properly managed by an organization.

Compliance testing can provide consistent, comparable insights into the governance process. By testing on a regular, consistent basis, organizations can compare improvement over time. Administrators can refine the process over time and make changes that refine and improve the process. For example, a policy relating to system configurations may assist in mitigating particular vulnerabilities and potentially eliminate the risk of a vulnerability altogether. Ensuring that the policy is being adhered to allows an organization to have greater protection over its information.

Security policies, or simply policies, can be viewed as a business requirement on actions or processes performed by an organization. These policies can set rules for users, define the consequences of violations, and minimize risk to an organization. Security policies can also be in the form of a standard that is an established norm or method, which can be a procedural standard or a technical standard implemented organization-wide. Policies can also include procedures that describe the steps required to implement a policy and guidelines that detail parameters on the implementation of those policies. For example, a guideline may make certain policies optional for some users and mandatory for other users.

In addition to policy compliance management, organizations can also implement vulnerability management to protect against potential vulnerabilities within their information technology (IT) infrastructure. By removing known vulnerabilities, it is more difficult for attackers to compromise an endpoint and gain a foothold in an environment. Vulnerability management is crucial because policy compliance management may not fully protect the systems from attackers in the existence of vulnerabilities.

Vulnerability management can attempt to protect against vulnerabilities by including a patch management system. Patch management, in conjunction with a software configuration management (SCM) system, can keep track of the versions and patch levels of servers and endpoints across an enterprise. It can push patches remotely to keep systems up to date. While helpful, patch management assumes that patches are available for a vulnerability and that there is enough time and manpower to apply those patches. However, in real environments, those conditions may not exist, and certain components may not be detectable by the SCM. For example, components like routers, firewalls, test machines, abandoned servers, and devices running incompatible operating systems are potentially undetectable and could become out of date. Given that posture, vulnerability management attempts to manage the risk by assessing the full domain of vulnerabilities that exist on networked devices and determining which vulnerabilities present the highest risk to an organization's security. Once that risk assessment is performed, mitigation techniques can be implemented.

Limitations on policy compliance management and vulnerability management remain, however, as these two security components are viewed separately when assessing risk to an environment. There are situations that may arise in an environment where a vulnerability may not necessarily expose an environment because there are policies in place that reduce the risk of the vulnerability. Currently, there is no correlation being performed between a given vulnerability and mitigation checks that are in place.

Embodiments of the present disclosure may overcome the above and other problems by providing mechanisms for combining policy compliance with vulnerability management to provide a more accurate risk evaluation of an environment. These mechanisms can utilize policy compliance logs to train and utilize a machine learning model in classifying mitigation techniques. Additionally, vulnerability logs (e.g., common vulnerability exposures (CVE) logs) used to train and utilize a machine learning model in classifying weaknesses (e.g., common weakness enumeration (CWE)). A mapping between the mitigation technique classifications and known attack techniques can be made. Additionally, another mapping between the weakness classifications and known attack techniques can also be made. During runtime operation, when a risk assessment is performed, the discovered attack techniques can be matched with corresponding mitigation techniques to provide a more accurate assessment of overall risk to an environment.

More specifically, machine learning models are used to identify a relationship between compliance security checks and vulnerabilities within an environment. When a vulnerability is detected within the environment, the corresponding policies in place are weighed against the risk assessment to provide an assessment that considers not only the weaknesses in an environment but also the policies in place that may mitigate such risk. For example, a vulnerability may be discovered regarding mounting a device (e.g., a portable hard drive, flash drive, etc.) on a server. However, a policy may exist that restricts and prevents the ability of a user to mount a device onto the server. As such, when considering the policy in conjunction with the risk, the overall risk assessment would be considered low as there are already measures in place that prevent the vulnerability from being utilized.

In some embodiments, producing the risk assessment includes first generating the risk assessment based on the vulnerability mapping. The initial risk assessment can be based on a detected vulnerability within the environment. Once generated, the attack techniques mapped to the vulnerability mapping can be compared with the attack techniques mapped to the policy mapping. Based on that comparison, a determination can be made that the policy mapping includes at least one attack technique as the vulnerability mapping. As there is at least one policy mapping that corresponds to the attack technique relating to the vulnerability, the initial risk assessment can be adjusted to provide a more accurate assessment of factors in the policies in place.

In some embodiments, a machine learning model is used to facilitate the mapping between mitigation techniques and attack techniques. Initially, a mitigation mapping machine learning model, using a third training dataset, is trained to generate attack technique classifications. The third training dataset can include mitigation techniques converted into feature vectors with corresponding classifications of attack techniques. The mitigation technique classifications can be inputted into the mitigation mapping machine learning model to produce attack technique classifications during runtime operation. The policy mapping can be produced based on the mitigation technique classifications mapped to their corresponding attack technique classifications.

In some embodiments, a machine learning model is used to facilitate the mapping between weakness types and attack techniques. Initially, a weakness mapping machine learning model, using a third training dataset, is trained to generate attack technique classifications. The third training dataset can include weakness types converted into feature vectors with corresponding classifications of attack techniques. The weakness type classifications can be inputted into the weakness mapping machine learning model to produce attack technique classifications during runtime operation. The vulnerability mapping can be produced based on the weakness type classifications mapped to their corresponding attack technique classifications.

Machine learning (ML) model-based policy compliance and vulnerability management mechanisms may be implemented in order to classify the computer system policies and vulnerabilities into an overall risk assessment of an environment. A variety of different ML models may be used for classifying computer system policies and vulnerabilities, and in some cases, an ensemble of such ML models may be utilized, such as an ensemble of the Random Forest, Gradient Boosting, and Deep Learning machine learning models, also referred to as "classifiers", as they classify the state of the computing system from the log data structure of the policies and vulnerabilities as to determine the risk assessment. In order to determine which ML model(s) to use in the particular policy compliance and/or vulnerability management mechanism being implemented.

FIG. 1 is a block diagram illustrating an operation of primary operational elements of an improved computing tool 100 for providing a risk assessment that combines policy compliance checks with vulnerability management results in accordance with embodiments of the present disclosure. The computing tool 100 includes a monitored computing environment 102, policy compliance checks 110, mitigation techniques 120, a policy machine learning model 130, policy training dataset 132, a mitigation machine learning model 140, a mitigation training dataset 142, a vulnerability list 150, a weakness type list 160, a vulnerability machine learning model 170, a vulnerability training dataset 172, a weakness machine learning model 180, a weakness training dataset 182, and a risk assessor 190. For purposes of the present description, it will be assumed that the illustrative embodiments are being implemented as part of a computer security mechanism and specifically are directed risk assessments that combine policy compliance and vulnerability management. However, this is only one possible implementation and is not intended to be limiting on the present disclosure. Other implementations in which anomalous patterns within input data may be identified may also be used without departing from the spirit and scope of the present disclosure.

The policy compliance checks 110 are scans of the monitored computing environment 102 that check whether components, computers, modules, devices, and the like, are adhering to security policies put into place by an enterprise. Within the policy compliance checks 110 are the security policies within a policy framework that are enforced on the monitored computing environment 102. Security policies, or simply policies, set requirements to protect information and the systems that store and process that information. A policy can be viewed as a requirement on actions or processes performed by an organization. The protection is against risks that can lead to unauthorized access, use, disclosure, disruption, modification, or destruction of information. These policies attempt to ensure the protection of information in any location and in any form. The creation of the policies can be dictated by many factors relating to the monitored computing environment 102. The factors include an organization's size, processes, types of information, and laws and regulations that an organization must adhere to.

The policy compliance checks 110 scans the monitored computing environment 102 and validates that the requirements within the security policies have been applied to security controls and information. The policy compliance checks 110 can measure compliance against a set of controls. These controls can define how information is protected. In some embodiments, the policy compliance checks 110 can report the number of devices adhering to each policy to determine a level of compliance. The level of compliance can take into account the usage and traffic throughput of the devices. For example, three firewalls are in compliance with a policy, and a fourth firewall is out of compliance. However, the fourth firewall handles seventy percent of Internet traffic. Taking that traffic throughput would mean that the organization is only thirty percent in compliance with the policy.

In some embodiments, the policy compliance checks include different domain policy requirements within the monitored computing environment 102. For example, the monitored computing environment 102 can include different domains such as a local area network (LAN) domain, a wide area network (WAN) domain, a user domain, a workstation domain, a remote access domain, a LAN-to-WAN domain, a system/application domain, and the like. Each of these domains can have unique policy requirements based on factors such as their equipment and operation. The policy compliance checks 110 can include information regarding each of these domains individually and/or separately.

The mitigation techniques 120 are techniques for vulnerabilities that are potentially mitigated by the techniques when they are put in place on the monitored computing environment 102. Each policy in the policy framework can be associated with mitigation techniques for potential vulnerabilities that the policy prevents. The mitigation techniques 120 can represent security concepts and classes of technologies that can be used to prevent vulnerability techniques or sub-techniques from being successfully executed. Mitigation techniques 120 include, but are not limited to, data backups, encryption, antiviruses, boot integrity, execution prevention, limited hardware/software installation, network segmentation, operating system configuration, password policies, registry restrictions, software updates, and user account control.

The policy machine learning model 130 is a component of the computing tool 100 configured as a machine learning model and trained to identify mitigation techniques of the policies in the policy framework. The policy machine learning model 130 can be configured as various types of machine learning (ML) models. These ML models include convolutional neural networks (CNNs), deep neural networks (DNNs), recurrent neural networks (RNNs), or other types of machine learning models. For example, the policy machine learning model 130 can be a deep learning model, a random forest model, a gradient boost model, a support vector machine, and the like. The policy ML model 130 is trained to input policies and classify the mitigation techniques related to the policies. While direct mappings exist for policies and mitigation techniques, some policies may relate to mitigation techniques that are not directly mapped. It should be noted, this is only one possible implementation, and it should be appreciated that other embodiments may be configured to provide classifications of different levels of granularity and complexity. For example, the policy machine learning model 130 can provide individual classifications for different types of mitigation techniques, such as vector outputs in which each vector slot corresponds to different classification and values in each of the vector slots indicate a probability that the corresponding classification applies to the particular inputs.

In order to be able to identify mitigation techniques from policies during runtime operation, the policy machine learning model 130 requires training from the training dataset 132 to classify features in the policies into mitigation techniques. Regarding training, the training dataset 132 is provided by a training dataset source (not shown). The training data in the training dataset 132 includes training data entries, representing policies, which each may represent policies 134 implementable on the monitored computing environment 102. Each training data entry also has a corresponding classification 136 for that training data entry, e.g., mitigation techniques. Additionally, the training dataset 132 can also include additional policies 134 that may or may not be currently implemented on the monitored computing environment 102, along with their corresponding correct classifications 136, or ground truth classifications.

The mitigation machine learning model 140 is a component of the computing tool 100 configured as a machine learning model and trained to identify attack techniques from the mitigation techniques produced by the policy machine learning model 140. Attack techniques are techniques on how an adversary achieves a tactical goal when performing an action. For example, access token manipulation is an attack technique where adversaries may modify access tokens to operate under a different user or system security context to perform actions and bypass access controls. Mitigation techniques, such as privileged account management and user account management, that limit users' ability to create tokens can be mitigation techniques that counter access token manipulation attacks.

The mitigation machine learning model 140 can be configured as various types of ML models. These ML models include CNNs, DNNs, RNNs, or other types of machine learning models. For example, the mitigation machine learning model 140 can be a deep learning model, a random forest model, a gradient boost model, a support vector machine, and the like. The mitigation ML model 140 is trained to input mitigation techniques and classify the attack techniques related to the inputted mitigation techniques. While direct mappings exist mitigation techniques and attack techniques, some mitigation techniques may relate to attack techniques that are not directly mapped. It should be noted, this is only one possible implementation, and it should be appreciated that other embodiments may be configured to provide classifications of different levels of granularity and complexity. For example, the mitigation machine learning model 140 can provide individual classifications for different types of mitigation techniques, such as vector outputs in which each vector slot corresponds to different classification and values in each of the vector slots indicate a probability that the corresponding classification applies to the particular inputs.

In order to be able to identify attack techniques from mitigation techniques during runtime operation, the mitigation machine learning model 140 requires training from the training dataset 142 to classify features in the mitigation technique into attack techniques. Regarding training, the training dataset 142 is provided by a training dataset source (not shown). The training data in the training dataset 142 includes training data entries, representing mitigation techniques, which each may represent mitigation techniques 144 implementable on the monitored computing environment 102. Each training data entry also has a corresponding classification 146 for that training data entry, e.g., attack techniques. Additionally, the training dataset 142 can also include additional mitigation techniques 144 that may or may not be currently implemented on the monitored computing environment 102, along with their corresponding ground truth classifications 146.

The vulnerability list 150 is an aggregation of cybersecurity vulnerabilities. These vulnerabilities can be detected and aggregated by gathering information from the monitored computing environment 102. This information includes information about the hosts on the network, endpoints, network devices, and the like. Host information can be gathered from an exploratory scan using a network mapping tool (e.g., Nmap), an asset database tool, or a configuration management database (CMDB). Vulnerability scanners can be implemented to discover vulnerabilities by interacting with devices, either through network-based scans or host-based agents. The vulnerabilities that are detected can be added to the vulnerability list 150. Network scanners can also be used to reach out to every Internet Protocol (IP) address within a range, or a specific list of IPs, to determine which ports are open, which services are running on those ports, the operating systems (OS) versions, and relevant configurations, and software packages running on each device. Host-based scan-less agents can query systems within the monitored computing environment 102 to determine running services and version information. These scans and vulnerability checks can be performed on a regular basis to ensure that the vulnerability list 150 includes current vulnerabilities. It should be noted that other scans and methods may be used to detect vulnerabilities.

In some embodiments, the vulnerability list 150 includes a Common Vulnerabilities and Exposures (CVE) list that includes publicly disclosed computer security flaws. CVEs provide a standardized identifier for a given vulnerability or exposure. Using the identifier, information can be accessed about the problem across multiple information sources that are compatible with CVEs. For example, security tools with reports containing references to CVE IDs may then access fixed information in a separate database that is also compatible with CVEs. In some embodiments, the vulnerability list 150 parses currently publicly known vulnerabilities and vulnerabilities detected within the monitored computing environment 102. The publicly known vulnerabilities can either be handled separately or together with the detected vulnerabilities.

The weakness type list 160 is an aggregation of software and hardware weakness types that have security ramifications. A "weakness" can be viewed as a flaw, fault, bug, or other error in software or hardware implementation, code, design, or architecture that, if left unaddressed, could result in systems, networks, or hardware being vulnerable to attack. Each weakness type can include a description, related weaknesses, a description of how the weakness is introduced into an environment, and potential vulnerabilities that are possible if the weakness is not addressed.

In some embodiments, the weakness type list 160 includes a Common Weakness Enumeration (CWE) list that includes publicly disclosed common weakness types and hardware weakness types. These weakness types can be divided into software and hardware weakness types and then categorized by the type of weakness. For example, software weakness type categories include authorization errors, encapsulation issues, privilege issues, random number issues, signal issues, type errors, and the like. Various weakness types can then be listed within those individual categories.

The vulnerability machine learning model 170 is a component of the computing tool 100 configured as a machine learning model and trained to identify weakness types from the vulnerabilities in the vulnerability list 150. The vulnerability machine learning model 170 can be configured as various types of ML models. These ML models include CNNs, DNNs, RNNs, or other types of machine learning models. For example, the vulnerability machine learning model 170 can be a deep learning model, a random forest model, a gradient boost model, a support vector machine, and the like. The vulnerability ML model 170 is trained to input vulnerabilities and classify weakness types related to the inputted vulnerabilities. While direct mappings exist between vulnerabilities and weakness types, some vulnerabilities may relate to weakness types that are not directly mapped. It should be noted, this is only one possible implementation, and it should be appreciated that other embodiments may be configured to provide classifications of different levels of granularity and complexity. For example, the vulnerability machine learning model 179 can provide individual classifications for different types of vulnerabilities, such as vector outputs in which each vector slot corresponds to different classification and values in each of the vector slots indicating a probability that the corresponding classification applies to the particular inputs.

In order to be able to identify weakness types from the vulnerabilities during runtime operation, the vulnerability machine learning model 170 requires training from the training dataset 172 to classify features in the mitigation technique into attack techniques. Regarding training, the training dataset 172 is provided by a training dataset source (not shown). The training data in the training dataset 172 includes training data entries, representing vulnerabilities, which each may represent vulnerabilities 174 discovered on the monitored computing environment 102. Each training data entry also has a corresponding classification 176 for that training data entry, e.g., weakness types. Additionally, the training dataset 172 can also include additional vulnerabilities 174 that may or not be currently discovered on the monitored computing environment 102, along with their corresponding ground truth classifications 146.

The weakness machine learning model 180 is a component of the computing tool 100 configured as a machine learning model and trained to identify attack techniques from the weakness types produced by the vulnerability machine learning model 170. Attack techniques are techniques on how an adversary achieves a tactical goal when performing an action. For example, access token manipulation is an attack technique where adversaries may modify access tokens to operate under a different user or system security context to perform actions and bypass access controls. Weakness types, such as weaknesses in file system access controls, system access controls, and user account controls, are weakness that potentially allow access token manipulation to occur.

The weakness machine learning model 180 can be configured as various types of ML models. These ML models include CNNs, DNNs, RNNs, or other types of machine learning models. For example, the weakness machine learning model 180 can be a deep learning model, a random forest model, a gradient boost model, a support vector machine, and the like. The weakness ML model 180 is trained to input mitigation techniques and classify the attack techniques related to the inputted mitigation techniques. While direct mappings exist between weakness types and attack techniques, some weakness types may relate to attack techniques that are not directly mapped. It should be noted, this is only one possible implementation, and it should be appreciated that other embodiments may be configured to provide classifications of different levels of granularity and complexity. For example, the weakness machine learning model 180 can provide individual classifications for different types of attack techniques, such as vector outputs in which each vector slot corresponds to different classification and values in each of the vector slots indicate a probability that the corresponding classification applies to the particular inputs.

In order to be able to identify attack techniques from weakness types during runtime operation, the weakness machine learning model 140 requires training from the training dataset 182 to classify features in the weakness types into attack techniques. Regarding training, the training dataset 182 is provided by a training dataset source (not shown). The training data in the training dataset 182 includes training data entries, representing weakness types 184, which each may represent weakness types 184 discovered on the monitored computing environment 102. Each training data entry also has a corresponding classification 186 for that training data entry, e.g., attack techniques. Additionally, the training dataset 182 can also include additional weakness types 184 that may or may not be currently discovered on the monitored computing environment 102, along with their corresponding ground truth classifications 186.

The risk assessor 190 is a component of the computing tool 100 configured to provide a risk assessment of the monitored computing environment 102. A risk assessment can measure the strength of the overall security of an environment and provide additional information necessary to make changes on security risks. The risk assessment can include an objective analysis of the effectiveness of the current security controls that protect an organization's assets and a determination of the probability of losses of those assets. Additionally, the risk assessment can review the monitored computing environment's 102 threat environment, the asset values, the system's criticality, the security controls' vulnerabilities, the expected losses impact, and also provide recommendations for additional controls to reduce the security risk to an acceptable level. Based on this information, a determination can be made if additional security controls are required.

The risk assessor can generate a risk assessment by analyzing the vulnerabilities in the vulnerability list, the corresponding weakness types, and a vulnerability mapping between weakness types and attack techniques. The risk assessor can further adjust the risk assessment by comparing the attack techniques mapped to the vulnerability mapping with the attack techniques mapped to a policy mapping between attack techniques and mitigation techniques. The mitigation techniques can represent security measures that are already in place within the monitored computing environment 102. When attack techniques are mapped to these mitigation techniques, the risk assessor 190 can reduce the severity of a risk-based on the mitigation techniques already being in place. For example, a network denial of service attack technique may be discovered from the vulnerabilities and weakness types that would generate a risk for the monitored computing environment 102. However, a mitigation technique such as filtering network traffic that reduces network traffic and prevents such an attack from occurring is in place.

The risk assessor 190 can adjust a risk assessment to a great or lower degree of risk-based, not only the vulnerabilities and weaknesses in the monitored environment 102, but also the mitigation techniques and policies in place within the monitored computing environment 102. The policy mapping can be used along with the vulnerability mapping to adjust the risk based on the similarities of attack techniques in the two mappings.

It is noted that FIG. 1 is intended to depict the major representative components of an improved computing tool 100. In some embodiments, however, individual components may have greater or lesser complexity than as represented in FIG. 1, components other than or in addition to those shown in FIG. 1 may be present, and the number, type, and configuration of such components may vary.

Figure 2:
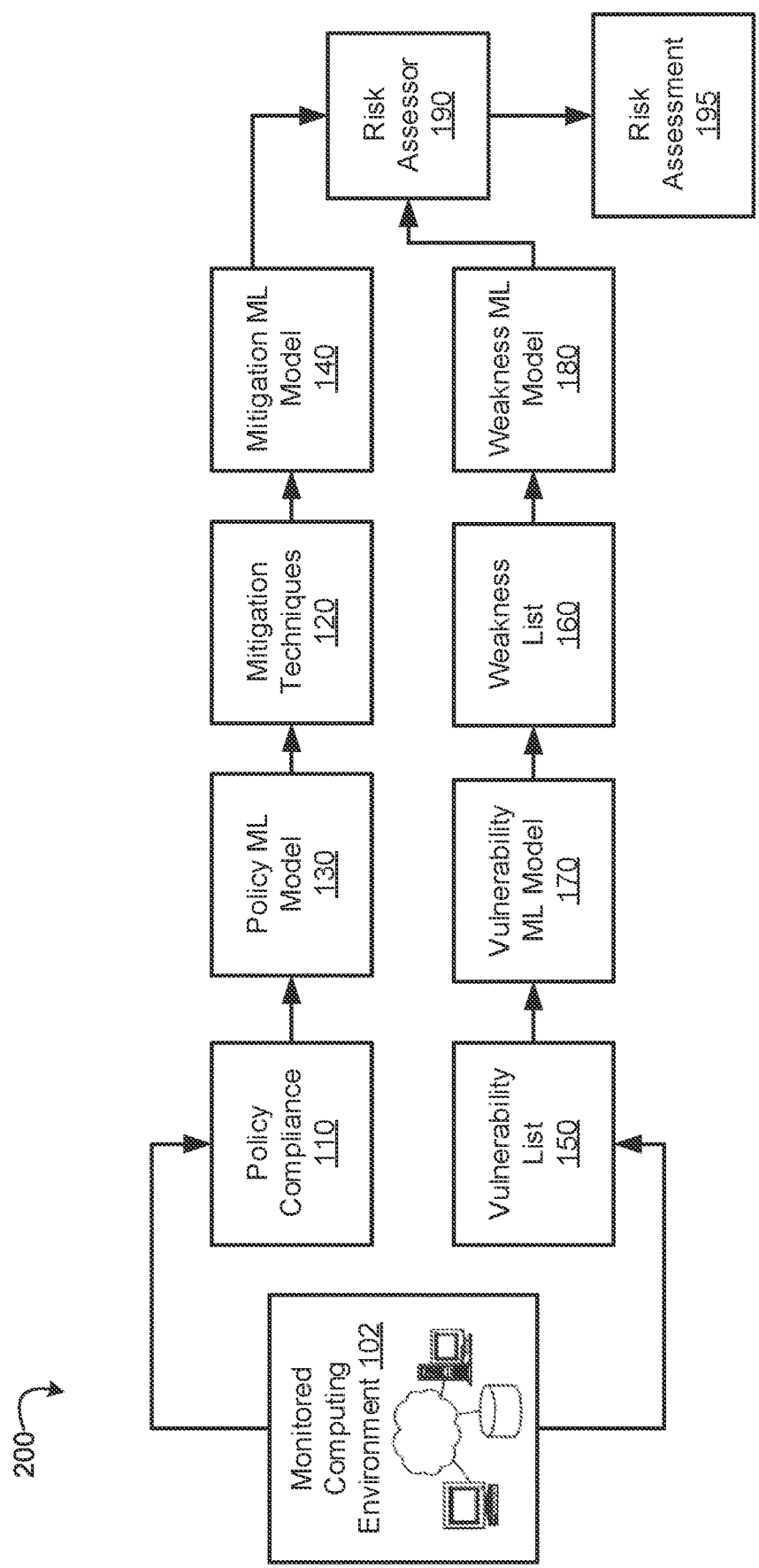
FIG. 2 is a block diagram illustrating an operation of trained machine learning models during runtime operation when determining a risk assessment of an environment and that is used by one or more embodiments of the present disclosure.

Having trained the policy machine learning model 130, the mitigation machine learning model 140, the vulnerability machine learning model 170, and the weakness machine learning model 180 in the manner described above, during runtime operation, as shown in FIG. 2, the policy machine learning model 130 can receive incoming data in the form of a policy compliance list 110 from the monitored computing environment 102 having a plurality of computing system resources, e.g., hardware and/or software resources, data structures, and the like, that can be evaluated to produce the policy compliance list 110 in the manner described above. Additionally, the vulnerability machine learning model 130 can receive incoming data in the form of a vulnerability list 150 from the monitored computing environment 102 by evaluating the computing system resources to produce the vulnerability list 150 in the manner described above.

The policy machine learning model 130 can generate a prediction of a classification of the incoming policy compliance list 110 and a mitigation technique 120 corresponding to that classification. The mitigation technique 120, in turn, can be used as incoming data for the mitigation machine learning model 140. The mitigation machine learning model 140 can generate a prediction of a classification of the incoming mitigation techniques 120 and an attack technique corresponding to that classification. The association between the mitigation technique and attack technique can be considered a policy mapping.

The vulnerability machine learning model 170 can generate a prediction of a classification of the incoming vulnerability list 150 and a weakness type 160 corresponding to that classification. The weakness type 160, in turn, can be used as incoming data for the weakness machine learning model 180. The weakness machine learning model 180 can generate a prediction of a classification of the incoming weakness types 160 and an attack technique corresponding to that classification. The association between the weakness type and the attack technique can be considered a vulnerability mapping.

This process may be repeated for each policy and vulnerability in the policy compliance list 110 and vulnerability list 150, respectively, such that a plurality of classifications, one for each of the policies and vulnerabilities, may be generated. In some embodiments, a combination of these classifications may be used to generate a single classification for the policy compliance list 110 and/or the vulnerability list 150, such as by using a logical "OR" operation, for example. In some cases, the probability/confidence values or scores may be combined using a suitable function to generate an overall probability/confidence score for the policy compliance list 110 or the vulnerability list 150, e.g., an average of the individual probability/confidence scores, a weighted average where certain ML models may be given greater weight values than others, or the like.

The risk assessor 190 can evaluate the policy compliance list 110, the vulnerability list 150, the mitigation techniques 120, the weakness types 160, the policy mapping, and the vulnerability mapping to generate an overall risk assessment 195. The risk assessor 190 can consider the attack techniques that are in both the policy mapping and the vulnerability mapping when producing a risk assessment.

The resulting risk assessment 195 generated by the risk assessor 190 may be output to a STEM system or other downstream computing system for the performance of responsive action. The responsive action may take any known or later developed form, including output a notification to a human analyst, such as via a user interface, for the risk assessments that require escalation. The user interface may comprise user interface elements for drilling down into the details of the notification, including identifying the individual vulnerabilities and weakness types within the risk assessment. In this way, the human analyst may identify which vulnerabilities and policies contributed to an escalation in the risk assessment. Moreover, probability/confidence values, weighting values, and the like for the classifications of the risk assessment may be provided in the notification to indicate more basis for the classification of the incoming data. User interface elements may be provided for allowing the user to provide input to indicate a correctness/incorrectness of the classification of the vulnerabilities, policies, mitigation techniques, and weakness types such that this information may be stored for the creation of new training datasets for updating the training of the ML models at a future time.

Thus, the illustrative embodiments provide mechanisms for combining policy compliance with vulnerability management to provide a more accurate risk assessment of a monitored computing system environment. Additionally, the mechanisms of the illustrative embodiments may operate in conjunction with STEM systems and/or other downstream computing systems to perform responsive actions in the event that a classification indicates a need to escalate the processing of the risk assessment, which may include outputting notifications via user interfaces that may provide functionality for drilling down into the details of the individual policies, vulnerabilities, their classifications, and the like.

Figure 3:
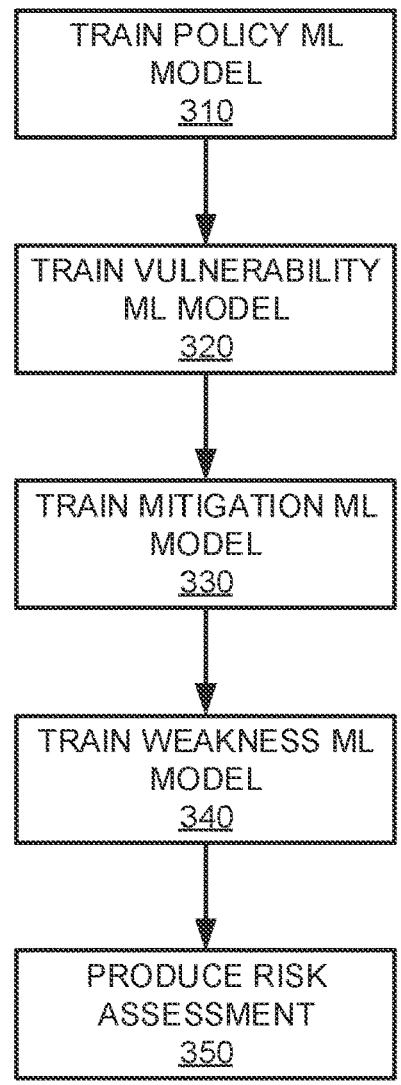
FIG. 3 is a flow diagram illustrating a process combining policy compliance with vulnerability management to provide a more accurate risk assessment of an environment and performed in accordance with embodiments of the present disclosure.

FIG. 3 is a flow diagram illustrating a process 300 of combining policy compliance with vulnerability management to provide a more accurate risk assessment of an environment, in accordance with embodiments of the present disclosure. As shown in FIG. 3, the process 300 begins by training a policy machine learning model 130 using a training dataset 132 with entries corresponding to policies, e.g., access control, domain enforcement, firewall restrictions, etc., and their corresponding correct classifications, e.g., mitigation techniques. This is illustrated at step 310. A vulnerability machine learning model 170 is trained using a training dataset 172 with entries corresponding to vulnerabilities, e.g., overflow vulnerabilities, code executions, denial-of-service overflow, etc., and their corresponding correct classifications, e.g., weakness types. This is illustrated at step 320.

A mitigation machine learning model 140 is trained using a training dataset 142 with entries corresponding to mitigation techniques and their corresponding attack techniques. This is illustrated at step 330. In some embodiments, a direct mapping between mitigation techniques and attack techniques is used. The mapping can be considered a policy mapping that can be used in place of the mitigation machine learning model 140. A weakness machine learning model is trained using a training dataset 186 with entries corresponding to weakness types and their corresponding attack techniques. This is illustrated at step 340. In some embodiments, a direct mapping between the weakness types and attack techniques is used. The mapping can be considered a vulnerability mapping that can be used in place of the weakness machine learning model 180.

A risk assessor 190 produces a risk assessment based, at least partially, on the combination of mappings of attack techniques produced from the mitigation machine learning model 140 and mapping of attack techniques from the weakness machine learning model 180. In some embodiments, the risk assessor 190 utilizes direct mappings to generate a risk assessment. This is illustrated at step 350.

Figure 4:
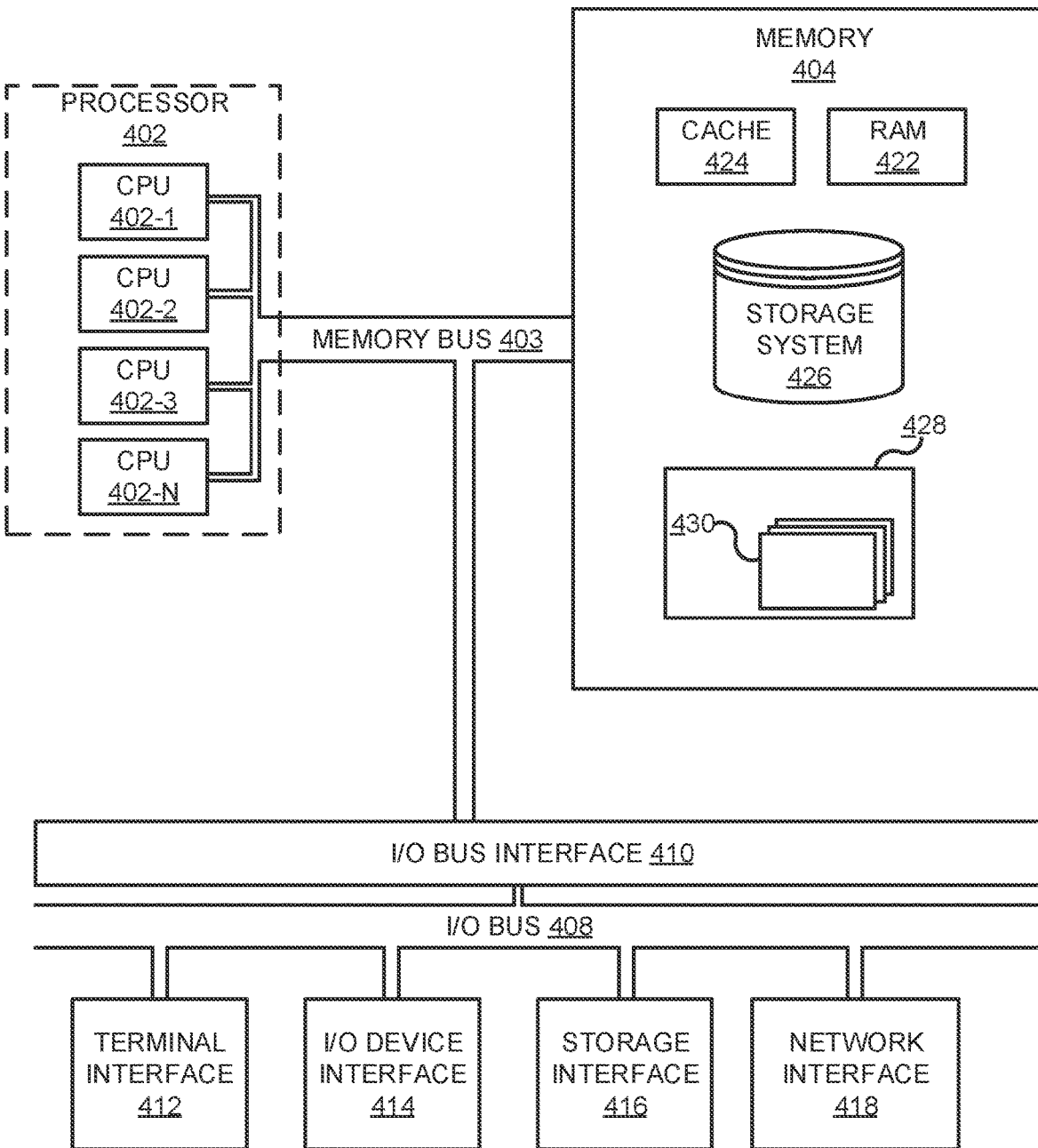
FIG. 4 is a high-level block diagram illustrating an example computer system that may be used in implementing one or more of the methods, tools, and modules, and any related functions, described herein in which the disclosure may be implemented.

Referring now to FIG. 4, shown is a high-level block diagram of an example computer system 400 (e.g., the improved computing tool 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the improved computing tool 100), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
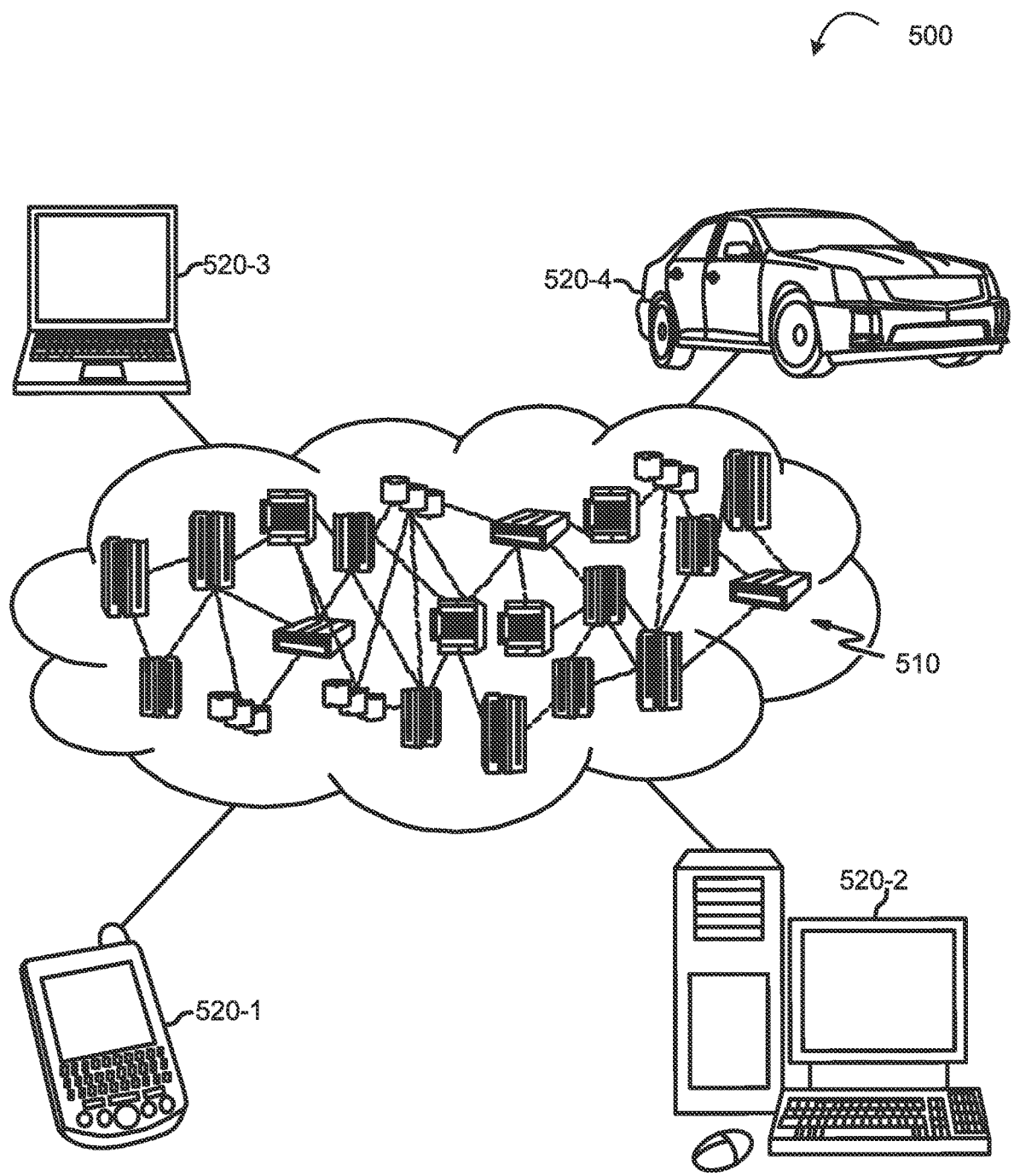
FIG. 5 depicts a cloud computing environment in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (P.D.A.) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
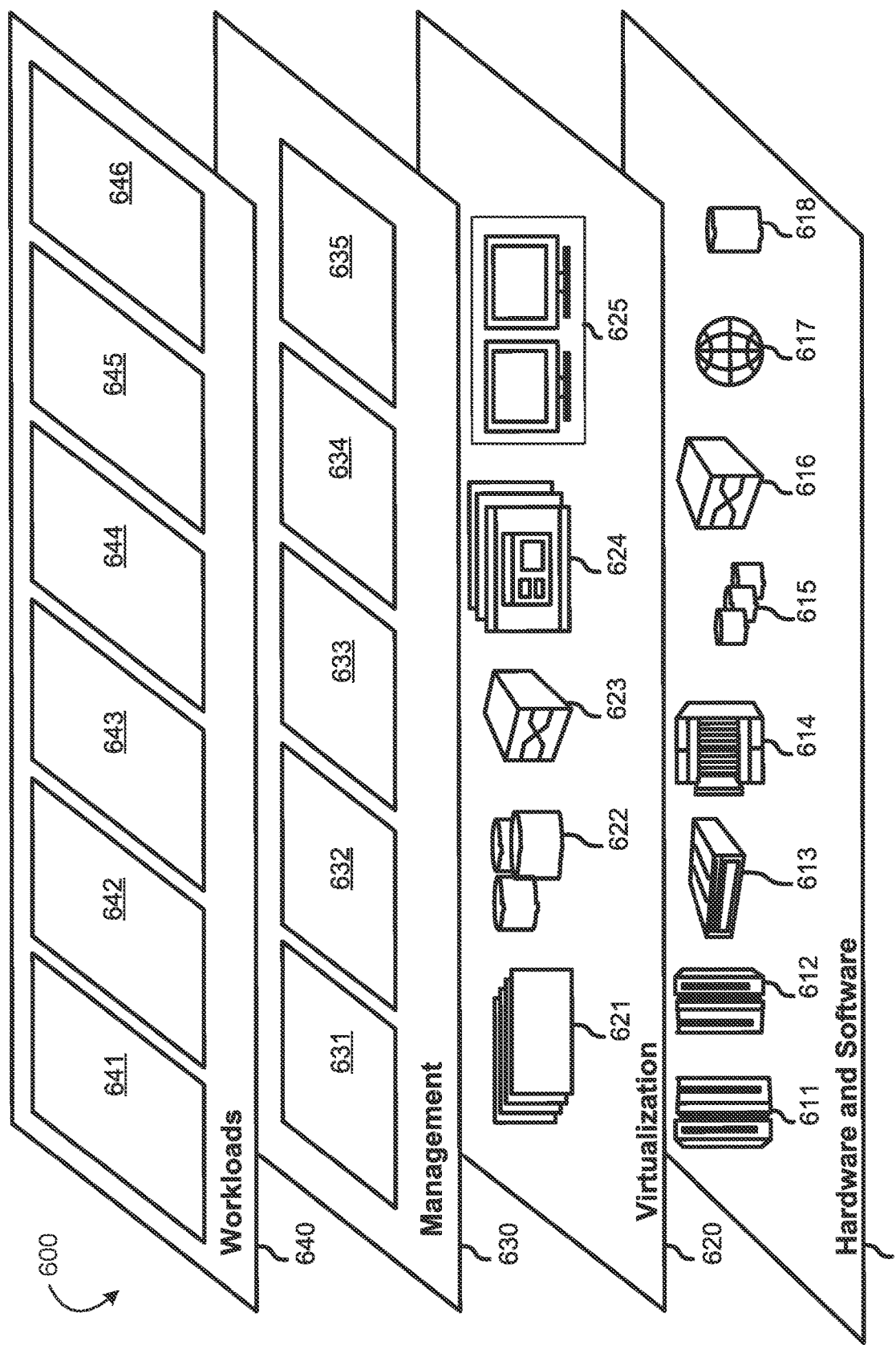
FIG. 6 depicts abstraction model layers in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (S.L.A.) planning and fulfillment 635 provide pre-arrangement for, and procurement of, cloud computing resources for which a future requirement is anticipated in accordance with an S.L.A.

Workloads layer 640 provides examples of functionality for which the cloud computing environment may be utilized. Examples of workloads and functions which may be provided from this layer include mapping and navigation 641; software development and lifecycle management 642 (e.g., improved computing tool 100); virtual classroom education delivery 643; data analytics processing 644; transaction processing 645; and a threat similarity analysis system 646.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising at least one processor and at least one memory, the memory comprising instructions executed by the processor to cause the processor to execute the method comprising:
   training a policy machine learning model using a first training dataset to predict mitigation technique classifications;
   training a vulnerability machine learning model using a second training dataset to predict weakness type classifications;
   receiving a policy compliance list and a vulnerability list;
   predicting, by the policy machine learning model, a set of mitigation technique classifications corresponding to the policy compliance list;
   predicting, by the vulnerability machine learning model, a set of weakness type classifications associated with the vulnerability list;
   mapping the set of mitigation technique classifications to a first set of attack techniques to produce a policy mapping;
   mapping the set of weakness type classifications to a second set of attack techniques to produce a vulnerability mapping; and
   producing a risk assessment based on the policy mapping and the vulnerability mapping, wherein the producing the risk assessment comprises comparing the first and second sets of attack techniques.

2. The method of claim 1, wherein producing the risk assessment comprises:
   determining, based on the comparison, that at least one attack technique is included in both the first and second sets of attack techniques; and
   adjusting the risk assessment based on the at least one attack technique.

3. The method of claim 1, wherein mapping the set of mitigation technique classifications to produce the policy mapping comprises:
   training a mitigation mapping machine learning model using a third training dataset to generate attack technique classifications, wherein the third training dataset includes mitigation techniques; and
   inputting the set of mitigation technique classifications into the mitigation mapping machine learning model to produce corresponding attack technique classifications.

4. The method of claim 1, wherein mapping the set of weakness type classifications to produce the vulnerability mapping comprises:
   training a weakness mapping machine learning model using a third training dataset to generate attack technique classifications, wherein the third training dataset includes weakness types; and
   inputting the set of weakness type classifications into the weakness mapping machine learning model to produce corresponding attack technique classifications.

5. The method of claim 4, wherein the weakness types derive from a common weakness enumeration (CWE) list.

6. The method of claim 1, wherein the first training dataset includes policy compliance entries converted into feature vectors with corresponding classifications of mitigation techniques.

7. The method of claim 1, wherein the second training dataset includes vulnerability entries converted into feature vectors with corresponding classifications of weakness types.

8. The method of claim 7, wherein the vulnerability entries derive from a common vulnerability and exposures (CVE) list.

9. A computer program product comprising a computer readable storage medium having a computer readable program stored therein, wherein the computer readable program, when executed on a computing device, causes the computing device to:
   train a policy machine learning model using a first training dataset to predict mitigation technique classifications;
   train a vulnerability machine learning model using a second training dataset to predict weakness type classifications;
   receive a policy compliance list and a vulnerability list;
   predict, by the policy machine learning model, a set of mitigation technique classifications corresponding to the policy compliance list;
   predict, by the vulnerability machine learning model, a set of weakness type classifications associated with the vulnerability list;
   map the set of mitigation technique classifications to a first set of attack techniques to produce a policy mapping;
   map the set of weakness type classifications to a second set of attack techniques to produce a vulnerability mapping; and
   produce a risk assessment based on the policy mapping and the vulnerability mapping, wherein the producing the risk assessment comprises comparing the first and second sets of attack techniques.

10. The computer program product of claim 9, wherein produce the risk assessment causes the computing device to:
    determine, based on the comparison, that at least one attack is included in both the first and second sets of attack techniques; and
    adjust the risk assessment based on the at least one attack technique.

11. The computer program product of claim 9, wherein map the set of mitigation technique classifications to produce the policy mapping causes the computing device to:
    train a mitigation mapping machine learning model using a third training dataset to generate attack technique classifications, wherein the third training dataset includes mitigation techniques; and
    input the set of mitigation technique classifications into the mitigation mapping machine learning model to produce corresponding attack technique classifications.

12. The computer program product of claim 9, wherein map the set of weakness type classifications to produce the vulnerability mapping causes the computing device to:
    train a weakness mapping machine learning model using a third training dataset to generate attack technique classifications, wherein the third training dataset includes weakness types; and input the set of weakness type classifications into the weakness mapping machine learning model to produce corresponding attack technique classifications.

13. The computer program product of claim 12, wherein the weakness types derive from a common weakness enumeration (CWE) list.

14. The computer program product of claim 9, wherein the first training dataset includes policy compliance entries converted into feature vectors with corresponding classifications of mitigation techniques.

15. The computer program product of claim 9, wherein the second training dataset includes vulnerability entries converted into feature vectors with corresponding classifications of weakness types.

16. The computer program product of claim 15, wherein the vulnerability entries derive from a common vulnerability and exposures (CVE) list.

17. An apparatus comprising:
a processor; and
a memory coupled to the processor, wherein the memory comprises instructions which, when executed by the processor, cause the processor to:
    train a policy machine learning model using a first training dataset to predict mitigation technique classifications;
    train a vulnerability machine learning model using a second training dataset generate predict weakness type classifications;
    receive a policy compliance list and a vulnerability list;
    predict, by the policy machine learning model, a set of mitigation technique classifications corresponding to the policy compliance list;
    predict, by the vulnerability machine learning model, a set of weakness type classifications associated with the vulnerability list;
    map the mitigation technique classifications to attack techniques to produce a policy mapping;
    map the weakness type classifications to the attack techniques to produce a vulnerability mapping; and
    produce a risk assessment of a vulnerability based on the policy mapping and the vulnerability mapping, wherein the producing the risk assessment comprises comparing the first and second sets of attack techniques.

18. The apparatus of claim 17, wherein produce the risk assessment causes the processor to:
    determine, based on the comparison, that at least one attack technique is included in both the first and second sets of attack techniques; and
    adjust the risk assessment based on the at least one attack technique.

19. The apparatus of claim 17, wherein map the set of mitigation technique classifications to produce the policy mapping causes the processor to:
    train a mitigation mapping machine learning model using a third training dataset to generate attack technique classifications, wherein the third training dataset includes mitigation techniques; and
    input the set of mitigation technique classifications into the mitigation mapping machine learning model to produce corresponding attack technique classifications.

20. The apparatus of claim 17, wherein map the set of weakness type classifications to produce the vulnerability mapping causes the processor to:
    train a weakness mapping machine learning model using a third training dataset to generate attack technique classifications, wherein the third training dataset includes weakness types; and
    input the set of weakness type classifications into the weakness mapping machine learning model to produce corresponding attack technique classifications.

* * * * *